US009266523B2

(12) United States Patent
Ideshio et al.

(10) Patent No.: US 9,266,523 B2
(45) Date of Patent: Feb. 23, 2016

(54) VEHICLE CONTROL APPARATUS THAT CONTROLS THROTTLE OPENING DEGREE DURING ENGINE STOP

(75) Inventors: Yukihiko Ideshio, Nissin (JP); Susumu Kojima, Susono (JP); Naoki Nakanishi, Susono (JP); Akihiro Sato, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 646 days.

(21) Appl. No.: 13/634,843

(22) PCT Filed: Oct. 28, 2011

(86) PCT No.: PCT/JP2011/006035
§ 371 (c)(1),
(2), (4) Date: Sep. 13, 2012

(87) PCT Pub. No.: WO2013/061378
PCT Pub. Date: May 2, 2013

(65) Prior Publication Data
US 2013/0166173 A1   Jun. 27, 2013

(51) Int. Cl.
*F16H 61/06* (2006.01)
*B60W 20/00* (2006.01)
(Continued)

(52) U.S. Cl.
CPC ............... *B60W 20/00* (2013.01); *B60W 10/06* (2013.01); *B60W 10/08* (2013.01); *B60W 10/10* (2013.01); *B60W 20/40* (2013.01); *F02D 9/02* (2013.01); *F02D 11/10* (2013.01); *F02D 17/04* (2013.01); *F02D 29/02* (2013.01);
(Continued)

(58) Field of Classification Search
CPC ... B60K 2741/065; B60K 6/48; B60W 10/06;
B60W 10/11; B60W 2510/1005; B60W 2510/0685; B60W 30/18018; F02D 17/02; F02D 25/04; F02D 11/10; F02D 41/0002; F02D 41/042; F02D 2200/501; F02N 11/0814; Y02T 10/42; Y02T 10/48
USPC .................. 701/103, 112, 113, 110; 123/399
See application file for complete search history.

(56) References Cited

U.S. PATENT DOCUMENTS

| 5,076,059 A * | 12/1991 | Okada ............................ 60/608 |
| 2002/0193930 A1 * | 12/2002 | Matsubara et al. ............. 701/54 |

(Continued)

FOREIGN PATENT DOCUMENTS

| EP | 1600629 A2 | 11/2005 |
| JP | 2005-344664 A | 12/2005 |

(Continued)

*Primary Examiner* — Hai Huynh
*Assistant Examiner* — Gonzalo Laguarda
(74) *Attorney, Agent, or Firm* — Dinsmore & Shohl LLP

(57) ABSTRACT

Disclosed is a vehicle control apparatus that can concurrently achieve an improved drivability and an excellent restart performance of an internal combustion engine. The vehicle control apparatus includes an eco-run system that automatically stops the engine when an automatic stop condition is established and restarts the engine when a restart condition is established, a throttle motor that opens and closes a throttle valve adjusting air amount to be sucked into the engine, and a vehicle speed sensor that detects the vehicle speed. The vehicle control apparatus is adapted to control the throttle motor to enlarge the throttle valve opening degree in response to the higher vehicle speed, according to the vehicle speed information from the vehicle speed sensor (Step S3 to Step S7), when the engine is automatically stopped while the vehicle is travelling (Step S2).

5 Claims, 7 Drawing Sheets

(51) Int. Cl.

| | | |
|---|---|---|
| *B60W 10/08* | (2006.01) | |
| *B60W 10/10* | (2012.01) | |
| *F02D 41/04* | (2006.01) | |
| *F02N 11/08* | (2006.01) | |
| *F02D 9/02* | (2006.01) | |
| *F02D 11/10* | (2006.01) | |
| *F02D 17/04* | (2006.01) | |
| *F02D 29/02* | (2006.01) | |
| *F02D 41/00* | (2006.01) | |
| *B60W 10/06* | (2006.01) | |

(52) U.S. Cl.
CPC .......... *F02D 41/0002* (2013.01); *F02D 41/042* (2013.01); *F02N 11/0814* (2013.01); *B60K 2741/065* (2013.01); *B60W 2510/1005* (2013.01); *B60W 2710/0605* (2013.01); *F02D 2011/102* (2013.01); *F02D 2200/501* (2013.01); *F16H 61/061* (2013.01); *Y02T 10/42* (2013.01); *Y02T 10/48* (2013.01); *Y10S 903/93* (2013.01); *Y10S 903/945* (2013.01)

(56) References Cited

U.S. PATENT DOCUMENTS

| | | | |
|---|---|---|---|
| 2003/0197385 A1* | 10/2003 | Onoyama et al. | 290/40 R |
| 2007/0204840 A1* | 9/2007 | Abe | 123/697 |
| 2007/0233357 A1* | 10/2007 | Sugai et al. | 701/105 |
| 2009/0241883 A1 | 10/2009 | Nagoshi et al. | |

FOREIGN PATENT DOCUMENTS

| | | | |
|---|---|---|---|
| JP | 2007-278124 A | 10/2007 | |
| JP | 2007-327364 A | 12/2007 | |
| JP | 2009-243292 A | 10/2009 | |

\* cited by examiner

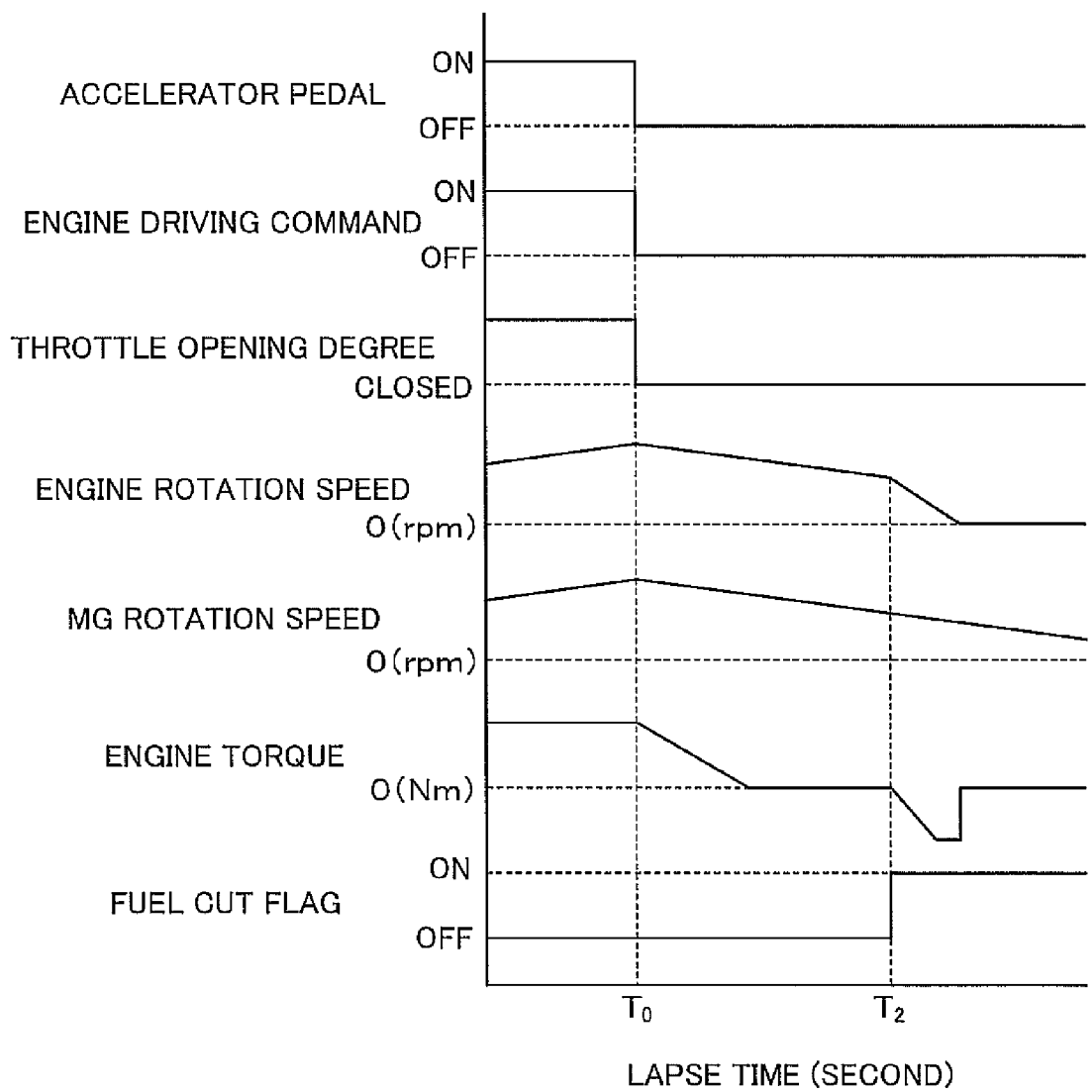

VEHICLE CONTROL APPARATUS THAT CONTROLS THROTTLE OPENING DEGREE DURING ENGINE STOP

TECHNICAL FIELD

The present invention relates to a vehicle control apparatus.

BACKGROUND ART

In recent years, there have been developed a wide variety of vehicles (hereinafter simply referred to as eco-run vehicles) each of which is provided with an internal combustion engine (hereinafter simply referred to as an engine) which can operate an idling stop system and an economy running system for the purpose of realizing a fuel-efficient driving and preventing environmental deteriorations such as global warming. As one of the representative environmentally friendly vehicles as such, there has so far been developed a hybrid vehicle having driving power sources including an engine and an electric motor.

The eco-run vehicle and the hybrid vehicle as previously mentioned are each provided with a control apparatus which can perform a so-called idling stop control to automatically stop the engine when the vehicle temporarily stops for example while the vehicle is waiting the traffic lights, and subsequently to restart the engine for the vehicle to restart moving. The hybrid vehicle has a control apparatus which is generally provided with an electric motor in addition to the engine as driving force sources, so that the vehicle control apparatus can control the automatic stop and restart of the engine in response to the driving conditions of the vehicle while the vehicle is travelling. The eco-nm vehicle and the hybrid vehicle are operated to reduce an unnecessary driving of the engine, thereby making it possible to achieve improved fuel consumption, reduction of exhaust gases, and reduction of noises.

In each of the eco-run vehicle and the hybrid vehicle, a driver's driving intention is indicated to the vehicle control apparatus by losing the brake depression force that shows the depression force of the brake pedal or by generating the accelerator depression force that shows the depression force of the accelerator pedal while the engine is stopped. When a predetermined restart condition is established while the driver's driving intention is indicated to the vehicle control apparatus, the vehicle control apparatus is required to immediately restart the engine.

In order to restart the engine in a short time, it is preferable that the amount of residual exhaust gas remaining in each of cylinders be as small as possible. One of the eco-run vehicles provided with such a vehicle control apparatus has so far been developed to facilitate discharging the exhaust gas in the cylinders with the increased opening degree of the throttle valve before the engine is stopped (see for example Patent Document 1).

The above conventional vehicle control apparatus is constructed to have a throttle valve temporarily opened to a relatively large predetermined opening degree in the engine stop routine. The throttle valve thus temporarily opened results in the fact that the amount of intake air is temporarily increased after a somewhat later time, and the amount of air to be sucked into each of the cylinders is increased before the engine is stopped. Therefore, the exhaust gas is discharged from each of the cylinders while the crankshaft of the engine is being rotated several revolutions by its inertia immediately before the engine stops, so that the air in the cylinder is practically replaced by fresh air. This means that the fresh air having pressure close to the atmospheric pressure comes to be filled in all of the cylinders after the engine stops. As a result, the restart performance of the engine can be improved.

CITATION LIST

Patent Literature

{Patent Document 1}
Japanese Patent Application Publication No. 2007-278124

SUMMARY OF INVENTION

Technical Problem

However, the conventional control apparatus for the vehicle tends to be subjected to aftershocks of the vehicle caused by stopping the engine while the throttle opening degree is being increased. The conventional control apparatus is, however, not designed in consideration of such aftershocks of the vehicle leading to a deteriorated drivability of the vehicle. For this reason, the conventional control apparatus encounters such a problem that the drivability of the vehicle and the restart performance of the engine are incompatible because of the occurrence of the aftershocks of the vehicle.

More specifically, the conventional control apparatus encounters such a problem that the vibrations of the travelling vehicle are generated, thereby leading to deteriorating the drivability of the vehicle when the engine is stopped while the vehicle is travelling, although the vibrations of the vehicle are suppressed if the vehicle is fixed with a foot brake when the vehicle is stopped.

The present invention has been made for solving the conventional problems encountered by the conventional vehicle control apparatuses, and it is therefore an object of the present invention to provide a vehicle control apparatus which can concurrently achieve an improved drivability of the vehicle and an excellent restart performance of the engine.

Solution to Problem

To achieve the above object, the vehicle control apparatus according to the present invention, is provided with an eco-run system which automatically stops an internal combustion engine under the condition that an automatic stop condition is established and restarts the internal combustion engine under the condition that a restart condition is established, and comprises a throttle opening and closing unit that opens and closes a throttle valve for regulating an amount of air to be sucked into the internal combustion engine, and a vehicle speed detection unit that detects a vehicle speed, and the vehicle control apparatus being operative to increase an opening degree of the throttle valve in response to the increased vehicle speed in accordance with the vehicle speed information outputted from the vehicle speed detection unit when the internal combustion engine is automatically stopped while the vehicle is travelling.

With the above constitution, the vehicle control apparatus is operative to increase the opening degree of the throttle valve in response to the increased vehicle speed when the engine is automatically stopped while the vehicle is travelling. For this reason, the fast vehicle speed results in the throttle valve having a large opening degree, so that the exhaust gas scavenging action in each of the cylinders can be carried out while the crankshaft of the engine is being rotated several revolutions by its inertia immediately before the engine stops. Therefore, the air in each of the cylinders is practically replaced by fresh air, and thus the fresh air having pressure close to the atmospheric pressure comes to be filled in all of the cylinders after the engine stops. As a result, the restart performance of the engine can be improved compared with that of the conventional case in which a large amount of highly non-combustible residual gas remains in each of the cylinders.

If the throttle valve is fully closed immediately before the engine stops, the intake negative pressure is increased, and the pumping loss is increased. The increased pumping loss leads to the fact that the engine rotation speed comes to rapidly be decreased to zero. The engine rotation is therefore occasionally stopped before each moving part of the engine reaches the predetermined stop position even in an attempt to stop each moving part such as a piston of the engine at a predetermined stop position by a stopping unit such as a valve stopping actuator. In addition, it becomes difficult to control the stopping unit to stop the each moving part of the engine at the predetermined stop position because of the sudden decrease in the acceleration of the rotation by the inertia of the engine.

According to the constitution of the present invention, the throttle valve is being opened when the engine is stopped, so that the pumping loss seldom occurs, and the engine is slowly stopped. For this reason, the rotation number of the engine increases by the inertia of the engine compared with that of the conventional case in which the throttle valve is fully closed when the engine is stopped, so that the each moving part of the engine can reach its predetermined stop position without fail. In addition, the fact that the rotation acceleration of the engine is gradually decreased by the inertia of the engine compared with the conventional case in which the throttle opening degree is fully closed makes it easy to control the stopping unit to stop the each moving part of the engine at its predetermined stop position. As a result, the each moving part of the engine can be accurately stopped at its stop position where the engine can be easily restarted, thereby making it possible to improve the restart performance of the engine.

In addition, the higher the speed of the vehicle is, the higher the resonance frequency of the vibration of the vehicle becomes, so that the difference between the resonance frequencies caused by the higher travelling speed of the vehicle and the resonance frequencies caused by the stoppage of the engine comes to be expanded. For this reason, the driver's sensitivity for the aftershocks generated by stopping the engine is decreased in response to the higher speed of the vehicle even with the throttle valve being opened at the large throttle opening degree. The vehicle control apparatus according to the present invention is thus constructed to have the throttle opening degree increased to the area in the range of the vehicle speed to alleviate the driver's sensitivity to a level as low as possible for the aftershocks at the high speed of the vehicle when the engine is stopped. The decreased driver's sensitivity for the aftershocks therefore makes it possible to suppress the drivability from being deteriorated.

It will therefore be understood that the throttle opening degree increased to a higher level in response to the higher vehicle speed makes it possible to concurrently achieve the suppression of the deterioration of the drivability and the restart performance of the engine.

In addition, the vehicle control apparatus according to the present invention further comprises a fuel supply apparatus to supply fuel to the internal combustion engine, and which is operative to control the fuel supply apparatus to stop supplying the fuel to the internal combustion engine and to hasten a timing to stop supplying the fuel to the internal combustion engine in response to the increased vehicle speed when the internal combustion engine is automatically stopped while the vehicle is travelling.

In the case that the engine is automatically stopped while the vehicle is travelling, the timing to stop supplying the fuel is delayed if the engine is slowly stopped with the aims of suppressing the aftershocks of the vehicle or of enhancing the accuracy of the stopping position of the crank shaft.

According to the constitution of the present invention, the vehicle control apparatus according to the present invention is operative to control the fuel supply apparatus to hasten the timing to stop supplying the fuel to the internal combustion engine in response to the increased vehicle speed, so that the timing to cut fuel can be hastened, thereby making it possible to improve the fuel consumption. In addition, the engine is stopped at the low driver's sensitivity area, so that the vehicle control apparatus can suppress the drivability from being deteriorated even in the event that the aftershocks of the vehicle are generated with the timing hastened to have the engine stopped.

The vehicle control apparatus according to the present invention further comprises a transmission drivably connected with the internal combustion engine, and is operative to hasten the timing to stop supplying the fuel to the internal combustion engine in response to an increased gear ratio set in the transmission. According to the above constitution, the driver's sensitivity for the aftershocks of the vehicle is alleviated to a lower level in response to the higher gear ratio, thereby making it possible to suppress the drivability from being deteriorated even in the event that the aftershocks of the vehicle are generated by the hastened timing of the fuel cut.

The vehicle control apparatus according to the present invention further comprises a transmission drivably connected with the internal combustion engine, and is operative to increase the opening degree of the throttle valve in response to the increased gear ratio set in the transmission. According to the above constitution, the driver's sensitivity for the aftershocks of the vehicle is alleviated to a lower level in response to the higher gear ratio, thereby making it possible to suppress the drivability from being deteriorated even if the throttle opening degree is increased.

Advantageous Effects of Invention

The present invention can provide a vehicle control apparatus which can concurrently achieve the improved drivability of the vehicle and the excellent restart performance of the engine.

BRIEF DESCRIPTION OF DRAWINGS

FIG. 7 is a time chart showing an operation in the event of releasing an accelerator pedal when the vehicle is travelling at a speed not exceeding a threshold value in the vehicle control apparatus according to the embodiment of the present invention.

DESCRIPTION OF EMBODIMENTS

A preferred embodiment of the vehicle control apparatus according to the present invention will be described hereinafter with reference to the accompanying drawings. The present embodiment shows an example of the present invention applied to a driving apparatus for a hybrid vehicle.

First, the constitution of the vehicle control apparatus according to the embodiment of the present invention will be described hereinafter.

Figure 1:
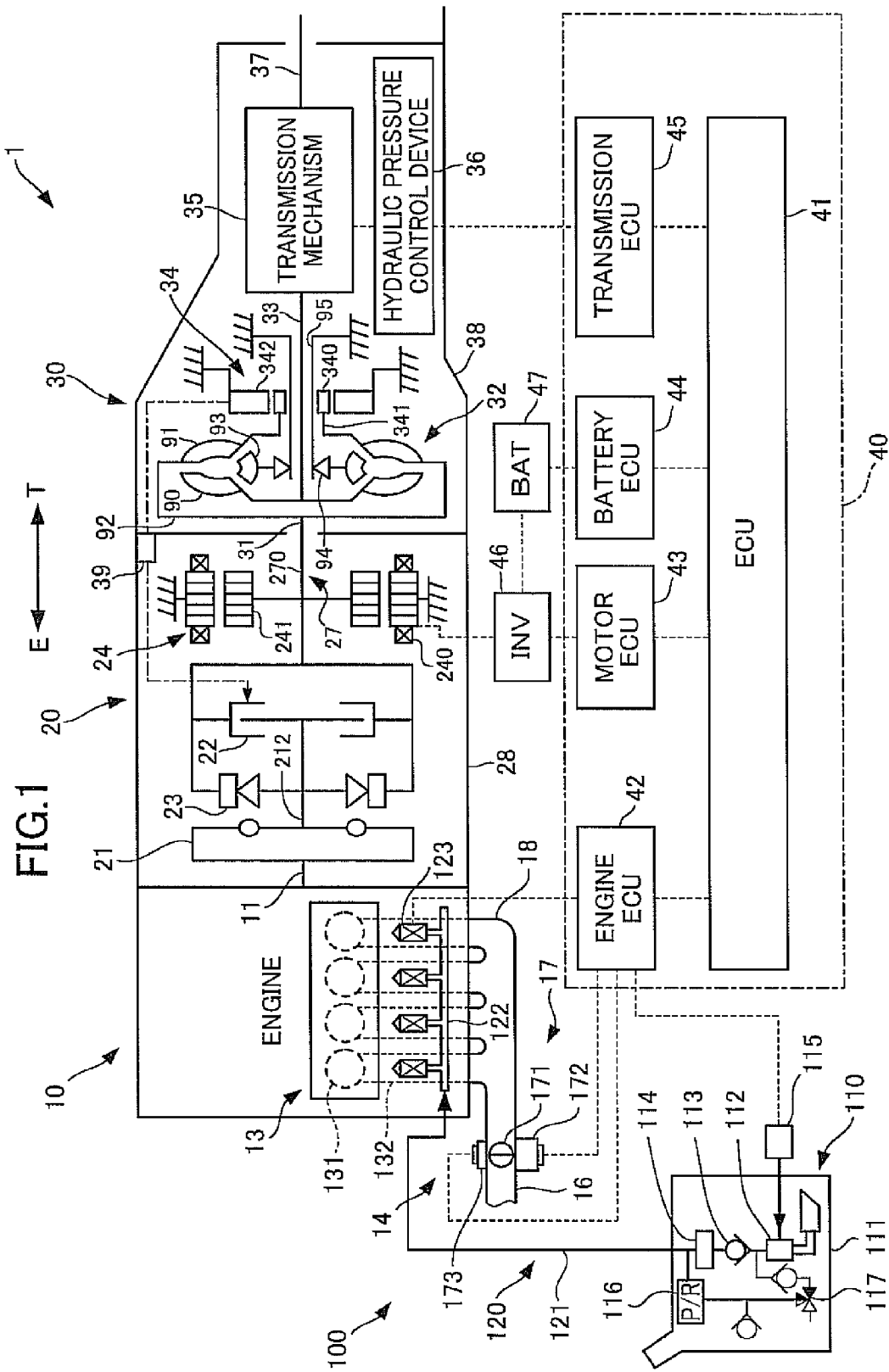
FIG. 1 is a schematic skeleton diagram showing a driving apparatus equipped with a vehicle control apparatus according to an embodiment of the present invention.

As shown in FIG. 1, a driving apparatus 1 is constituted by an engine 10, a fuel supply apparatus 100, a driving unit 20, an automatic transmission 30, and a control unit 40. In the present embodiment, the direction toward the engine 10 of the driving apparatus 1 is represented by an engine side E, while the direction toward the automatic transmission 30 of the driving apparatus 1 is represented by an automatic transmission side T.

The engine 10 is constituted by a known motive power unit which outputs a motive power by combusting the mixture of air and fuel containing hydrocarbons such as gasoline or diesel oil in the combustion chamber not shown. The engine 10 is constituted by an engine body 13, an intake unit 14, and an exhaust unit not shown. The engine 10 constitutes an internal combustion engine as defined in the present invention.

The engine body 13 has a plurality of cylinders 131, and intake ports 132 respectively provided to the cylinders 131. The intake ports 132 have the insides of the cylinders 131 held in communication with the outsides of the cylinders 131, respectively.

The intake unit 14 is constituted by an intake pipe 16, a throttle valve portion 17, and an intake manifold 18. The intake manifold 18 is adapted to connect the intake pipe 16 with each of the intake ports 132.

The throttle valve portion 17 is constituted by a throttle valve 171 and a throttle motor 172. The throttle valve 171 is disposed at the downstream portion of the intake pipe 16 and is adapted to regulate the intake flow of the intake air to be supplied to each cylinder 131. The throttle motor 172 is electronically controlled, so that the throttle valve 171 can be opened and closed by the control of the control unit 40. The throttle motor 172 constitutes a throttle opening and closing unit as defined in the present invention. The throttle valve 171 is partly constituted by a throttle opening degree sensor 173. The throttle opening degree sensor 173 is adapted to detect the opening degree of the throttle valve 171 and to input the value of the opening degree to the control unit 40.

The engine 10 is adapted to have the piston (not shown) reciprocated in each cylinder 131 by repeating the intake of the air-fuel mixture, the combustion of the air-fuel mixture, and the exhaustion of the exhaust gas in the combustion chamber of each cylinder 131, and to rotate the crankshaft 11 drivably connected with the piston. The engine 10 is adapted to transmit the torque to the driving unit 20 from the crankshaft 11. The crankshaft 11 is provided with an engine rotation speed sensor 19. The engine rotation speed sensor 19 is adapted to detect the rotation speed of the crankshaft 11 and to input a detection signal indicative of the rotation speed to the control unit 40.

In addition, the engine 10 is provided with a cam shaft (not shown) to reciprocate the piston at a given timing, and with a stopping unit such as a valve stopping actuator to stop the cam shaft at a given position.

The fuel supply apparatus 100 is constituted by a fuel tank portion 110, and a pipe portion 120. The fuel supply apparatus 100 constitutes a fuel supply apparatus as defined in the present invention.

The fuel tank portion 110 is constituted by a fuel tank 111, a fuel pump 112, a discharge check valve 113, a fuel filter 114, a fuel pump control computer 115, a pressure regulator 116, and an electromagnetic valve 117. The fuel tank 111 is adapted to store fuel therein.

The fuel pump 112 is adapted to pump up and discharges the fuel to supply the fuel to the pipe portion 120 through the discharge check valve 113 and the fuel filter 114. The fuel pump 112 is constituted by a low pressure variable discharge pressure pump, and is provided with a pump rotor and a motor not shown. The rotation speed of the pump rotor is varied in response to the rotation speed of the driving motor, so that the discharge flow amount and the feed pressure of the fuel pump 112 can be changed.

The fuel pump control computer 115 is interposed between the control unit 40 and the fuel pump 112. The fuel pump control computer 115 is adapted to control the rotation speed by turning on and off the fuel pump 112 in accordance with the pump control signal from the control unit 40.

The pressure regulator 116 is connected with the pipe portion 120 at the downstream side of the fuel filter 114. The electromagnetic valve 117 is constituted by a three-way valve, and connected with a discharge side pipe of the fuel pump 112, a surplus fuel discharge pipe of the variable pressure regulator 116, and a pipe opened to the fuel in the fuel tank 111.

In the present embodiment, the fuel pump 112 is assumed to be variable in the feed pressure, but the present invention is not limited to this embodiment. The fuel pump 112 may be constituted by a pump operative to have a constant feed pressure. The above pump has a feed pressure which may be controlled by allowing the back pressure of the variable pressure regulator 116 to be switchable to at least two stages, viz., the high pressure and the law pressure by the electromagnetic valve.

The pipe portion 120 is constituted by a fuel pipe 121, a delivery pipe 122, and fuel injection valves 123 which are arranged in this order.

The fuel pipe 121 is connected with the fuel filter 114 of the fuel tank portion 110. The fuel pipe 121 is further connected to the delivery pipe 122. The delivery pipe 122 is connected with the fuel injection valves 123. Each of the fuel injection valves 123 is adapted to inject the fuel to the intake port 132. Each of the fuel injection valve 123 is constituted by an electromagnetic valve and adapted to inject the fuel to the intake port 132 by the control signal outputted from the control unit 40.

The driving unit 20 is provided with an input portion 21, a clutch 22, a one-way clutch 23, a motor generator 24, an output portion 27, and a case portion 28. The driving unit 20 is interposed between the engine 10 and the automatic transmission 30, and adapted to transmit the motive power from the crankshaft 11 of the engine 10 to a transmission input shaft 31 forming part of the automatic transmission 30 which will be described in detail hereinafter.

The input portion 21 is provided with a clutch input shaft 212. The clutch input shaft 212 is coaxially disposed with the crankshaft 11. The clutch input shaft 212 is integrally rotatably connected with the clutch 22 and the one-way clutch 23, and adapted to transmit the motive power to the clutch 22 and the one-way clutch 23.

The output portion 27 is provided with a clutch output shaft 270. The clutch output shaft 270 is coaxially disposed with the clutch input shaft 212. The clutch output shaft 270 is integrally rotatably connected with the clutch 22 and the one-way clutch 23, and adapted to transmit the motive power of the clutch 22 and the one-way clutch 23 to the outside. The clutch output shaft 270 is integrally rotatably connected with the transmission input shaft 31 of the automatic transmission 30, and adapted to transmit the output of the driving unit 20 to the automatic transmission 30.

The motor generator 24 is constituted by a stator 240 and a rotor 241. The motor generator 24 is interposed in the motive power transmission path between the crankshaft 11 and the transmission input shaft 31. The stator 240 is provided with three-phase coils, and the rotor 241 is embedded with a plurality of permanent magnets.

The rotor 241 is provided with a motor rotation speed sensor 243. The motor rotation speed sensor 243 is adapted to detect the rotation speed of the motor generator 24, and to input a detection signal indicative of the rotation speed to the control unit 40 by detecting the rotation speed of the rotor 241.

The motor generator 24 is adapted to function as a motor for rotationally driving the rotor 241 by the interaction between the magnetic field generated by the permanent magnets embedded in the rotor 241 and the magnetic field generated by the three-phase coils of the stator 240. In addition, the motor generator 24 is adapted to operate as an electric generator which gives rise to the electromotive force at both ends of the three-phase coils by the interaction between the magnetic field generated by the permanent magnets embedded in the rotor 241 and the rotation of the rotor 241.

The motor generator 24 is electrically connected with an inverter 46. The inverter 46 is electrically connected with a battery 47. Therefore, the motor generator 24 is adapted to perform the electric power exchange with the battery 47 through the inverter 46. The battery 47 is adapted to have the electric power generated by the motor generator 24 selectively charged into the battery 47 or discharged from the battery 47 depending upon the operation conditions of the hybrid vehicle.

The power line from the inverter 46 to the motor generator 24 has an MG electric current sensor 461 mounted thereon. The MG electric current sensor 461 is adapted to detect the phase electric current, and to input a detection signal indicative of the phase electric current to the control unit 40. The output terminals of the battery 47 have a battery voltage sensor 471 mounted therebetween. The battery voltage sensor 471 is adapted to detect the output voltage of the battery 47, and to input a detection signal indicative of the output voltage to the control unit 40. The output terminals of the battery 47 have a battery electric current sensor 472 mounted thereon. The battery electric current sensor 472 is adapted to detect the charging and discharging electric current of the battery 47, and to input a detection signal of the charging and discharging electric current to the control unit 40. The battery 47 has a battery temperature sensor 473 mounted thereon. The battery temperature sensor 473 is adapted to detect the battery temperature, and to input a detection signal indicative of the battery temperature to the control unit 40.

The clutch 22 is interposed between the crankshaft 11 and the transmission input shaft 31. The clutch 22 is constituted by a multi-plate clutch and is of a normally open type. The clutch 22 is normally released to have the the engine 10 and the motor generator 24 disconnected from each other, and is operative to have the engine 10 connected with the motor generator 24 in response to the engagement operation of the clutch 22 caused by the high pressure operation oil supplied from an oil pump 34. The clutch 22 is provided on the inner peripheral portion of the motor generator 24.

The one-way clutch 23 is interposed between the crankshaft 11 and the transmission input shaft 31 to have the crankshaft 11 connected rotatably only in the positive direction with the transmission input shaft 31. Here, the term "positive direction" means the rotation direction of the crankshaft 11. The one-way clutch 23 is also provided on the inner peripheral portion of the motor generator 24. The one-way clutch 23 is disposed axially adjacent to the clutch 22 on the inner peripheral portion of the motor generator 24.

The one-way clutch 23 is operative to transmit the rotation of the crankshaft 11 to the clutch output shaft 270 when the rotation speed of the crankshaft 11 is higher than the rotation speed of the clutch output shaft 270. The one-way clutch 23 is, on the other hand, operative not to transmit the rotation of the crankshaft 11 to the clutch output shaft 270, and to allow the clutch output shaft 270 to rotate freely when the rotation speed of the crankshaft 11 is lower than that of the clutch output shaft 270.

The case portion 28 accommodates therein the input portion 21, the clutch 22, the one-way clutch 23, the motor generator 24, and the output portion 27.

Between the clutch input shaft 212 and the case portion 28 is provided an input shaft rotation speed sensor 29. The input shaft rotation speed sensor 29 is adapted to detect the rotation speed of the clutch input shaft 212, and to input a detection signal indicative of the rotation speed to the control unit 40. The input shaft rotation speed sensor 29 is, for example, constituted by a resolver.

The automatic transmission 30 is provided with the transmission input shaft 31, a torque converter 32, a transmission mechanism input shaft 33, the oil pump 34, a transmission mechanism 35, a hydraulic pressure control device 36, an output shaft 37, and a case 38. The automatic transmission 30 partly constitutes a transmission as defined in the present invention.

The torque converter 32 is of a fluid-type that uses the effect of a circulating operation oil, and is operative to transmit the driving force transmitted from the clutch output shaft 270 of the driving unit 20 to the transmission mechanism 35 through the transmission mechanism input shaft 33. The torque converter 32 is provided with a turbine runner 90, a pump impeller 91, a front cover 92, a stator 93, a one-way clutch 94, and a hollow shaft 95.

The turbine runner 90 and the pump impeller 91 are arranged in face-to-face relationship with each other with the turbine runner 90 being positioned at the engine side E. The turbine runner 90 is integrally rotatably connected with the transmission mechanism input shaft 33. The pump impeller 91 is integrally rotatably connected with the transmission input shaft 31 through the front cover 92.

The stator 93 is provided at the inner peripheral side between the turbine runner 90 and the pump impeller 91. The stator 93 is connected with the hollow shaft 95 through the one-way clutch 94. The hollow shaft 95 is secured to the case 38 and rotatably accommodates the transmission mechanism input shaft 33 therein. The operation oil is supplied to the inside of the case 38.

The oil pump 34 is provided with a rotor 340, a hub 341, and a body 342. The hub 341 is cylindrical in shape to have the rotor 340 integrally rotatably connected with the pump impeller 91. The body 342 is secured to the case 38. For this reason, the motive power from the driving unit 20 is transmitted to the rotor 340 from the front cover 92 through the pump impeller 91 so as to drive the oil pump 34.

The hydraulic oil discharged from the oil pump 34 is adapted to be supplied to the clutch 22 of the driving unit 20 (as shown by the dashed line in the FIG. 1) as well as the transmission mechanism 35. The oil pump 34 is operative to execute the switching action of the gear shift stage or the gear shift ratio of the transmission mechanism 35, and to execute the connection of the clutch 22 in response to the supply of the hydraulic pressure.

Between the oil pump 34 and the clutch 22 is provided a hydraulic pressure adjustment valve 39 which is operative to adjust the supply amount of the operation oil from the oil pump 34 to the clutch 22 in accordance with the signal from the control unit 40.

The transmission mechanism 35 is operative to form the desired gear shift stage by selectively switching the engagement or disengagement of the plurality of clutches and brakes with the hydraulic pressures variably supplied from the hydraulic pressure control device 36 in response to the travelling states of the hybrid vehicle. The transmission mechanism 35 has the gear shift stages including, for example, N (Neutral) range, D (Drive) range, R (Reverse) range, B (Brake), M (Manual) range, and other ranges. The driving force transmitted from the transmission mechanism input shaft 33 is adapted to be transmitted to the output shaft 37 through the transmission mechanism 35, and thus to be transmitted to the driving wheels from the output shaft 37 through a differential not shown in the figures.

Figure 2:
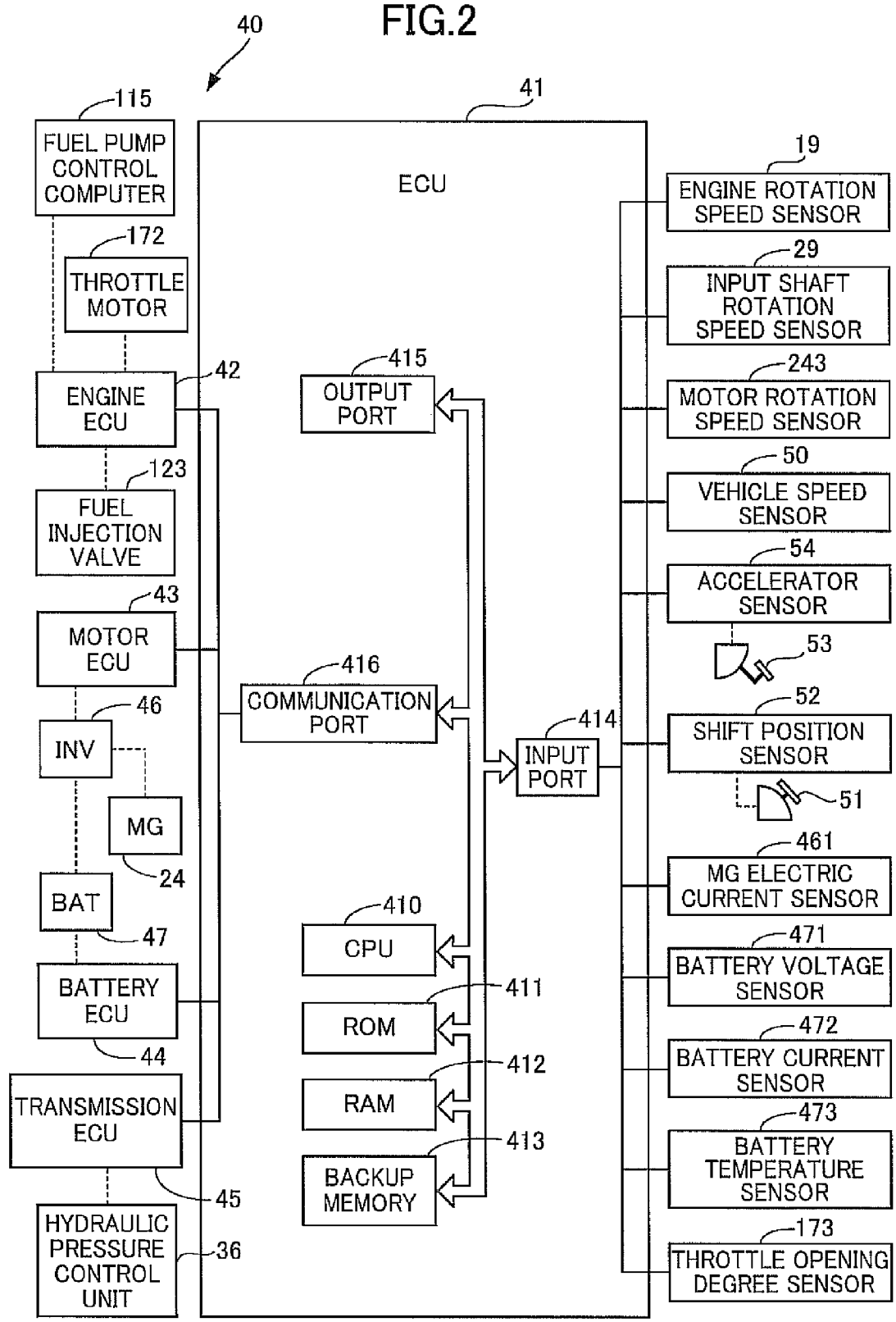
FIG. 2 is a schematic diagram showing the vehicle control apparatus according to the embodiment of the present invention.

As shown in FIG. 2, the control unit 40 is provided with a hybrid electronic control unit (Electronic Control Unit; hereinafter simply referred to as an ECU) 41, an engine electronic control unit (hereinafter simply referred to as an engine ECU) 42, a motor electronic control unit (hereinafter simply referred to as a motor ECU) 43, a battery electronic control unit (hereinafter simply referred to as a battery ECU) 44, and a transmission electronic control unit (hereinafter simply referred to as a transmission ECU) 45. The control unit 40 constitutes a control unit for the vehicle.

The ECU 41 is provided with a CPU (Central Processing Unit) 410, a ROM (Read Only Memory) 411 that stores processing programs and the like, a RAM (Random Access Memory) 412 that temporarily stores data, a backup memory 413, an input port 414, an output port 415, and a communication port 416. The ECU 41 is adapted to oversee the control of the hybrid vehicle.

With the input port 414 of the ECU 41 are connected an MG electric current sensor 461, the battery voltage sensor 471, the battery electric current sensor 472, the battery temperature sensor 473, a vehicle speed sensor 50, a shift position sensor 52, and an accelerator sensor 54.

The vehicle speed sensor 50 is adapted to detect the vehicle speed to input a detection signal indicative of the vehicle speed to the control unit 40. The shift position sensor 52 is adapted to detect the range position of the shift lever 51 as a shift position signal to input the signal indicative of the range position to the control unit 40.

The accelerator sensor 54 is adapted to detect the depression amount of the accelerator pedal 53 depressed, and to input a detection signal indicative of the depression amount to the ECU 41. In addition, the ECU 41 is adapted to calculate the accelerator opening degree Acc from the depression amount of the accelerator pedal 53 indicated by the detection signal outputted from the accelerator sensor 54.

The ECU 41 is connected with the engine ECU 42, the motor ECU 43, the battery ECU 44, and the transmission ECU 45 through the communication port 416. The ECU 41 is adapted to exchange various control signals and data with the engine ECU 42, the motor ECU 43, the battery ECU 44, and the transmission ECU 45.

The control unit 40 is adapted to operate the eco-run system that automatically stops the engine 10 under the condition that the automatic stop condition is established and automatically restarts the engine 10 under the condition that the restart condition is established. The automatic stop conditions include, for example, (1) acceleration off (throttle fully closed), (2) brake on, and (3) low speed travelling equal to or lower than a predetermined speed. The control unit 40 is adapted to stop the engine 10 when the state that meets all of the automatic stop conditions (1) to (3) continues for a predetermined time or more. The automatic stop conditions may be appropriately changed depending on the situation.

Figure 4:
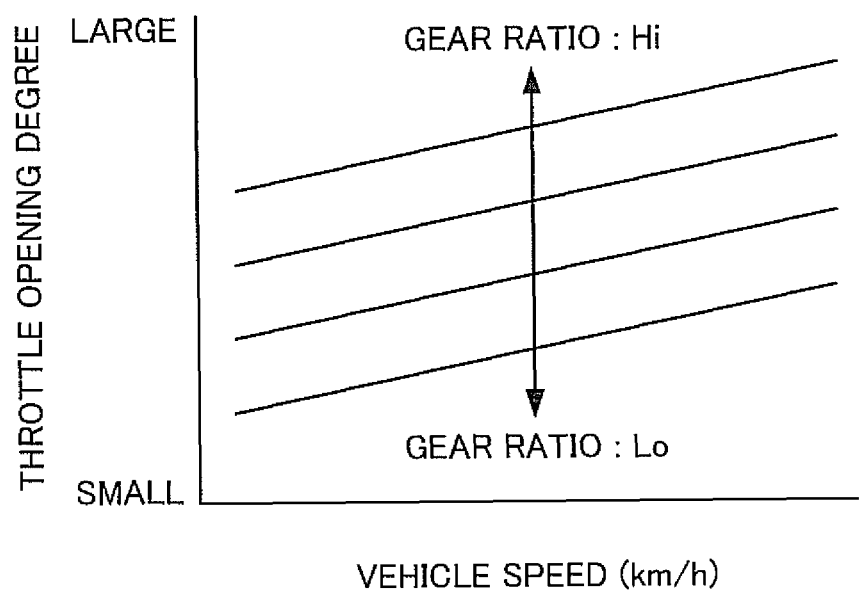
FIG. 4 is a map showing a relationship between the throttle opening degree and the vehicle speed at each gear ratio in the vehicle control apparatus according to the embodiment of the present invention.
Figure 5:
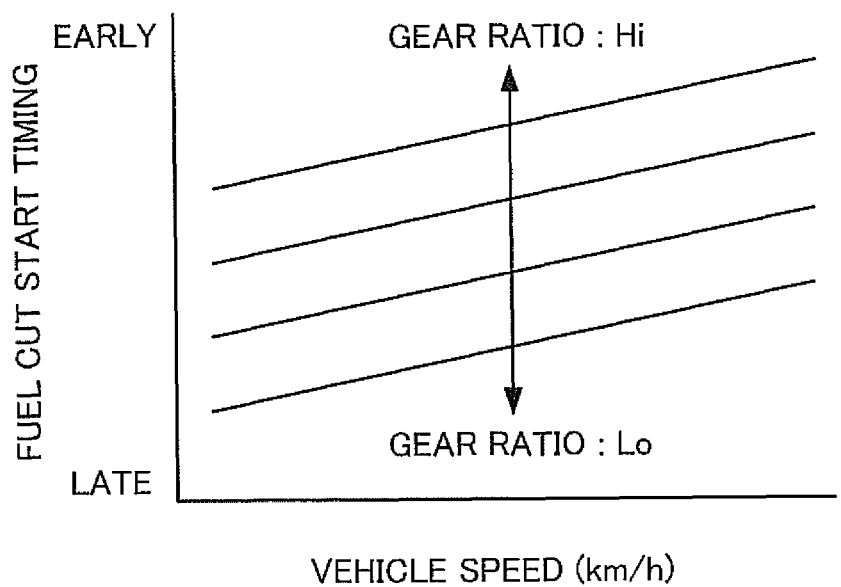
FIG. 5 is a map showing a relationship between fuel cut start timing and the vehicle speed at each gear ratio in the vehicle control apparatus according to the embodiment of the present invention.

The ROM 411 and the backup memories 413 are adapted to store the map information including a map indicative of the relationship between the throttle opening degree and the vehicle speed shown in FIG. 4, a map indicative of the relationship between the fuel cut start timing and the vehicle speed shown in FIG. 5, and the other maps.

As shown in FIG. 4, the map indicative of the relationship between the throttle opening degree and the vehicle speed is used for setting the opening degree of the throttle valve 171 in the case that the vehicle speed exceeds the predetermined threshold value when the engine 10 is stopped. For the same gear ratios, the higher the vehicle speed is, the larger the throttle opening degree is set. For the same vehicle speeds, the higher the gear ratio is, the larger the throttle opening degree is set. This is based on the fact that the driver's sensitivity to the vibrations of the engine 10 is more alleviated in response to the higher vehicle speed or the higher gear ratio. This makes it possible to suppress the drivability from being decreased even if the throttle opening degree is increased.

The ECU 41 is operative to set the opening degree of the throttle valve 171 in accordance with the vehicle speed information obtained from the vehicle speed sensor 50 and the gear ratio information of the transmission mechanism 35 obtained from the transmission ECU 45 when the engine 10 is stopped.

The ECU 41 is operative to set the opening degree of the throttle valve 171 with reference to the map indicative of the relationship between the throttle opening degree and the vehicle speed in accordance with the vehicle speed information and the gear ratio information if the vehicle speed exceeds the threshold value when the engine 10 is stopped. In other words, the ECU 41 is operative to open the throttle valve 171 and to set the throttle opening degree at a larger level in response to the higher vehicle speed when the engine 10 is automatically stopped while the hybrid vehicle is travelling. On the other hand, the ECU 41 is operative to close the throttle valve 171 if the vehicle speed is equal to or lower than the predetermined threshold value when the engine 10 is stopped.

As shown in FIG. 5, the map indicative of the relationship between the fuel cut start timing and the vehicle speed is used for setting the timing of the fuel cut in the case that the vehicle speed exceeds the predetermined threshold value when the engine 10 is stopped. For the same gear ratios, the higher the vehicle speed is, the earlier the fuel cut start timing is set. For the same vehicle speeds, the higher the gear ratio is, the earlier the fuel cut start timing is set. This is based on the fact that the driver's sensitivity to the vibrations of the engine 10 is more alleviated in response to the higher vehicle speed or the higher gear ratio. The earlier fuel cut as previous mentioned makes it possible to suppress the drivability from being decreased even if the aftershocks of the vehicle are generated.

The ECU 41 is operative to set the timing of the fuel cut in accordance with the vehicle speed information obtained from the vehicle speed sensor 50 and the gear ratio information of the transmission mechanism 35 obtained from the transmission ECU 45 when the engine 10 is stopped.

The ECU 41 is operative to set the timing of the fuel cut with reference to the map indicative of the relationship between the fuel cut start timing and the vehicle speed in accordance with the vehicle speed information and the gear ratio information if the vehicle speed exceeds the threshold value when the engine 10 is stopped. The timing of the fuel cut with reference to the map indicative of the relationship between the fuel cut start timing and the vehicle speed is set at a time earlier than the conventional normal timing. In other words, the ECU 41 is operative to perform the fuel cut and to set the timing of the fuel cut earlier in response to the higher vehicle speed, when the engine 10 is automatically stopped while the hybrid vehicle is travelling. On the other hand, the ECU 41 is operative to perform the fuel cut at the conventional normal timing if the vehicle speed is equal to or lower than the predetermined threshold value when the engine 10 is stopped.

The engine ECU 42 is electrically connected with the engine 10 and the ECU 41. The engine ECU 42 is adapted to be inputted with the signals from the various sensors that detect the operation state of the engine 10, and to execute the operation controls such as the fuel injection control, the ignition control, the suction air amount adjustment control, and the other operation controls in response to the inputted signals. The engine ECU 42 can execute the fuel control by controlling the fuel injection valves 123, execute the fuel pressure adjustment and the fuel cut control by controlling the fuel pump control computer 115, and further control the suction air amount by controlling the throttle motor 172.

The engine ECU 42 is adapted to communicate with the ECU 41. The engine ECU 42 is adapted to execute the operation control of the engine 10 by the control signals inputted from the ECU 41, and to output data about the operation state of the engine 10 to the ECU 41 as necessary.

The motor ECU 43 is electrically connected with the inverter 46 and the ECU 41. The motor ECU 43 is operative to execute the driving control of the motor generator 24. The motor ECU 43 is adapted to be inputted with signals necessary for the driving control of the motor generator 24. The signals necessary for the driving control of the motor generator 24 include, for example, a signal inputted from the motor rotation speed sensor 243 of the motor generator 24, a phase current signal applied to the motor generator 24 detected by the MG electric current sensor 461, and the other signals. The motor ECU 43 is operative to output a switching control signal to the inverter 46.

The battery ECU 44 is electrically connected with the battery 47 and the ECU 41. The battery ECU 44 has a function of managing the battery 47. The battery ECU 44 is adapted to be inputted with signals necessary for the control of the battery 47. The signals necessary for the control of the battery 47 include, for example, a signal indicative of the voltage between the terminals inputted from the battery voltage sensor 471, a signal indicative of charging/discharging current inputted from the battery current sensor 472, a signal indicative of the battery temperature inputted from the battery temperature sensor 473, and the other signals.

The transmission ECU 45 is electrically connected with the automatic transmission 30 and the ECU 41. The transmission ECU 45 is operative to execute the driving control of a lock-up clutch not shown, and to change the gear shift stage of the transmission mechanism 35.

The throttle motor 172, the vehicle sensor 50, and the control unit 40 as previously mentioned constitute as a whole a vehicle control apparatus as defined in the present invention. This means that the vehicle control apparatus according to the present invention is provided with the eco-run system that automatically stops the engine 10 under the condition that the automatic stop condition is established and restarts the engine 10 under the condition that the restart condition is established.

The vehicle control apparatus according to the present invention is provided with the throttle motor 172 that closes or opens the throttle valve 171, the vehicle sensor 50 that detects the vehicle speed, and the control unit 40 that controls the throttle motor 172 to have the opening degree of the throttle valve 171 increased in response to the higher vehicle speed in accordance with the vehicle speed information inputted from the vehicle speed sensor 50 when the engine 10 is automatically stopped while the vehicle is travelling.

The vehicle control apparatus according to the present invention is further provided with the fuel supply apparatus 100 that supplies the fuel to the engine 10. The control unit 40 is operative to control the fuel supply apparatus 100 to stop supplying the fuel to the engine 10, and to control the fuel supply apparatus 100 to have the timing of stopping the supply of the fuel hastened in response to the higher vehicle speed, when the engine 10 is automatically stopped while the vehicle is travelling.

The operation of the vehicle control apparatus according to the present embodiment will be explained hereinafter.

Figure 3:
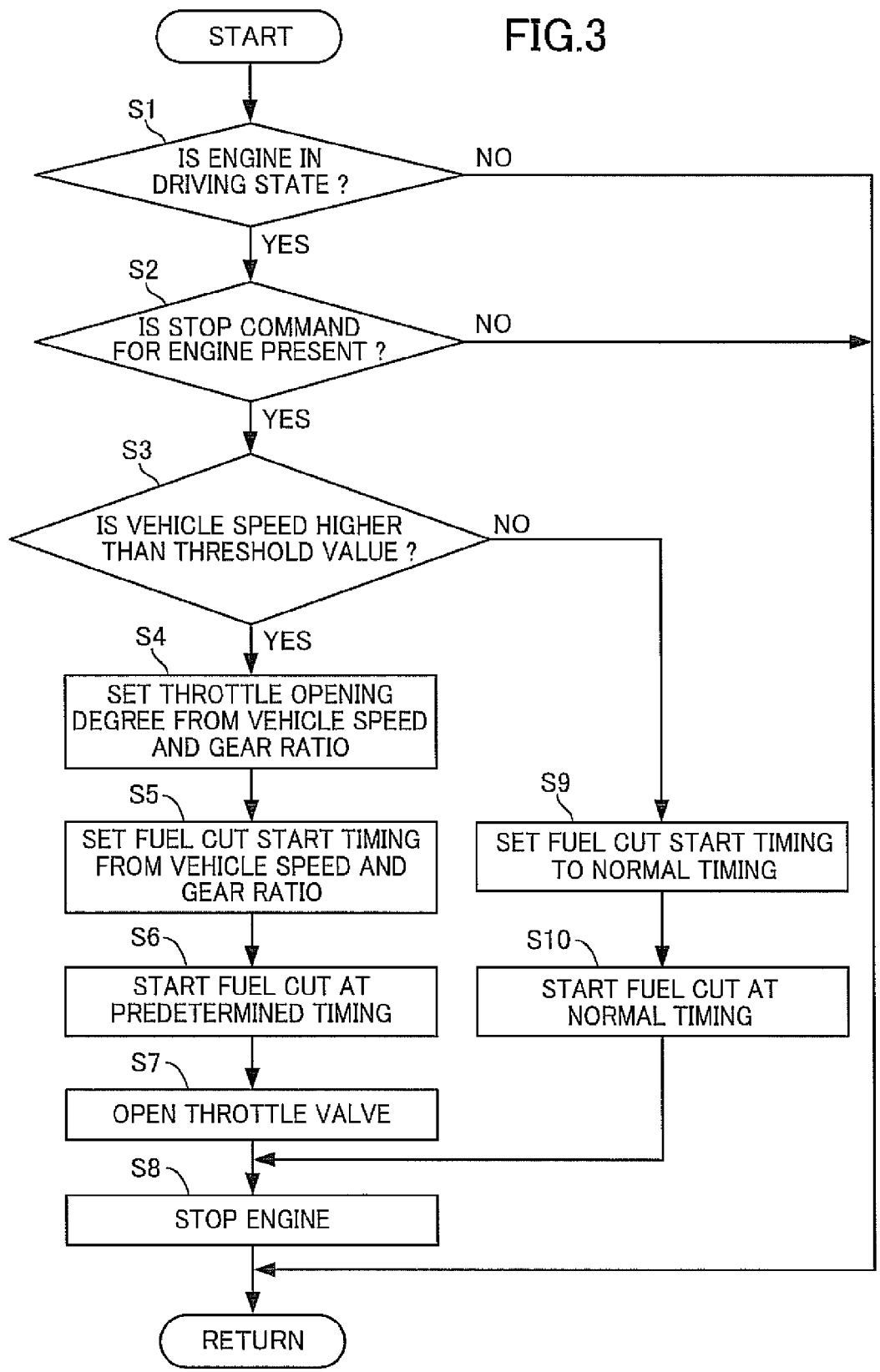
FIG. 3 is a flow chart showing an operation of the vehicle control apparatus according to the embodiment of the present invention.

As shown in FIG. 3, the ECU 41 is operated to determine whether or not the engine 10 is in a driving state (Step S1). If the ECU 41 determines that the engine 10 is not in the driving state (NO in Step S1), the ECU 41 returns to the main routine process.

If the ECU 41 determines that the engine 10 is in the driving state (YES in Step S1), the ECU 41 determines whether or not the stop command for the engine 10 is present (Step S2). The determination whether or not the stop command for the engine 10 is present, for example, is performed by the ECU 41 according to the information inputted from the accelerator sensor 54 when the accelerator pedal 53 is released.

If the ECU 41 determines that the stop command for the engine 10 is not present with reference to the automatic stop conditions (NO in Step S2), the ECU 41 returns to the main routine process. If the ECU 41 determines that the stop command for the engine 10 is present with reference to the automatic stop conditions (YES in Step 52), the ECU 41 determines whether or not the vehicle speed exceeds the predetermined threshold value (Step S3). The determination whether or not the vehicle speed exceeds the predetermined threshold value is performed by the ECU 41 according to the information inputted from the vehicle speed sensor 50. The predetermined threshold value can be 80 km/h, for example. However, it is not limited to 80 km/h, of course.

If the ECU 41 determines that the vehicle speed exceeds the threshold value (YES in Step S3), the driver's sensitivity to the vibration of the engine 10 is recognized as low, and the ECU 41 refers to the vehicle speed and the gear ratio. Then the ECU 41 sets the opening degree of the throttle valve 171 in accordance with the map of the throttle opening degree vs. the vehicle speed (Step 4). More specifically, the ECU 41 sets the opening degree of the throttle valve 171 to the desired opening degree by the operation of the throttle motor 172 through the engine ECU 42 with reference to the information inputted from the throttle opening degree sensor 173.

Subsequently, the ECU 41 sets the timing of the fuel cut in accordance with the map of the fuel cut start timing vs. the vehicle speed with reference to the vehicle speed and the gear ratio (Step S5). The timing of the fuel cut is earlier than the conventional normal timing, thereby making it possible to improve the fuel consumption.

The ECU 41 is operated to start the fuel cut at the predetermined timing (Step S6). More specifically, the ECU 41 closes the fuel injection valve 123 through the engine ECU 42 and stops the fuel pump 112 through the engine ECU 42 and the fuel pump control computer 115.

The ECU 41 opens the throttle valve 171 with the opening degree set in Step S4 at the same time with the fuel cut start (Step S7).

The crankshaft 11 of the engine 10 rotates several times by the inertia, and the gases in the cylinders 131 are discharged to be almost replaced with the fresh air in the meantime. This leads to the fact that the fresh air nearly at the atmospheric pressure exists in all of the cylinders 131 after the engine 10 is stopped. Accordingly, it is possible to improve the restart performance of the engine 10 compared with that of the case that a large amount of highly non-combustible residual gas is filled in the cylinders 131.

The pumping loss seldom occurs because the throttle valve 171 is open, and the engine 10 is gradually stopped. For this reason, each of the moving parts such as the piston, the crankshaft 11, and the like can reach far enough to the predetermined stop positions respectively because the rotation number of the crankshaft 11 by the inertia of the engine 10 increases compared with that of the case in which the throttle valve is fully closed. It becomes easy to control the valve stopping actuator so that each of the moving parts of the engine 10 stop at the predetermined positions respectively because the decrease of the rotation acceleration of each of the moving parts by the inertia of the engine 10 is slower compared with that of the case in which the throttle valve is fully closed. This allows each of the moving parts of the engine 10 to be stopped with high accuracy at the position easy to restart the engine 10, thereby making it possible to improve the restart performance of the engine 10.

The piston and the crankshaft 11 is stopped at the predetermined stop position by the operation of the valve stopping actuator while the fuel cut is executed, and thus the engine 10 is stopped (Step S8). Then the ECU 41 returns to the main routine process.

If the ECU 41 determines that the vehicle speed does not exceed the threshold value (NO in Step S3), the driver's sensitivity to the vibration of the engine 10 is recognized as high, and the ECU 41 sets the timing of the fuel cut to the normal timing (Step 9). Then the ECU 41 is operated to start the fuel cut at the predetermined normal timing (Step S 10). The piston and the crankshaft 11 is stopped at the predetermined stop position by the operation of the valve stopping actuator while the fuel cut is executed, and thus the engine 10 is stopped (Step S8). The ECU 41 is then operated to return to the main routine process.

Figure 6:
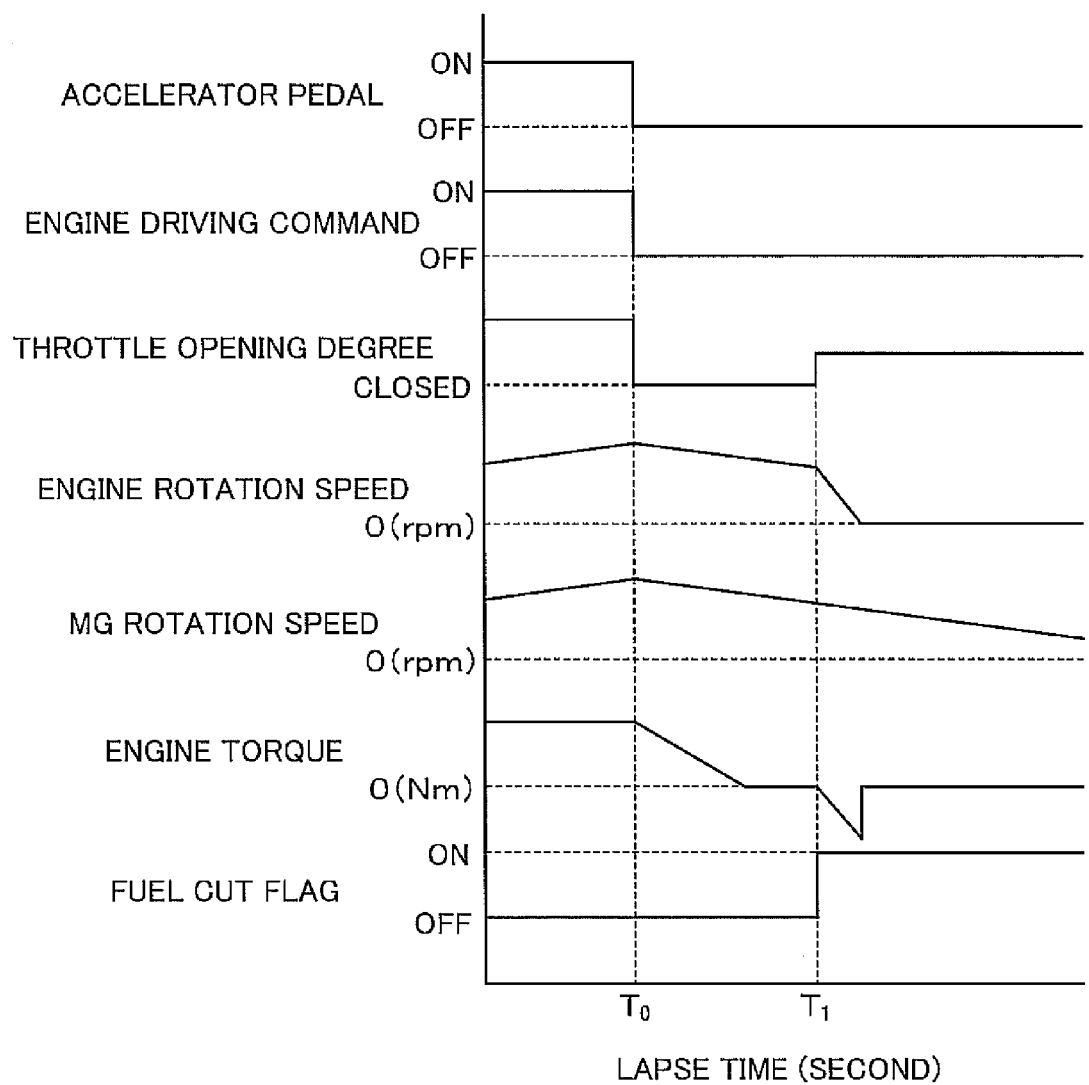
FIG. 6 is a time chart showing an operation in the event of releasing an accelerator pedal when the vehicle is travelling at the speed higher than the threshold in the vehicle control apparatus according to the embodiment of the present invention.

Next, the operation when the accelerator pedal 53 is released while the vehicle is travelling at the speed exceeding the threshold value with the engine 10 will be explained hereinafter along with the time chart shown in FIG. 6.

When the hybrid vehicle is travelling at the speed exceeding the threshold value with the engine 10, the driver releases the accelerator pedal 53 at $T_0$. Thus, since the engine driving command becomes off, the ECU 41 closes the throttle valve 171. This allows the engine rotation speed to be gradually lowered, and the engine torque is drastically decreased to zero.

In the unstable state in the operation of the engine immediately after the engine torque goes to zero, the ECU 41 opens the throttle valve 171 to the preset opening degree at $T_1$. The ECU 41 turns on the fuel cut flag and executes the fuel cut. Here, $T_1$ is earlier than $T_2$ as the timing of the normal fuel cut in FIG. 7, thereby making it possible to improve the fuel consumption.

The engine 10 is stopped by the fuel cut. This allows the engine rotation speed to be drastically lowered, and the engine torque is also drastically decreased to zero. The crankshaft 11 of the engine 10 rotates several times by the inertia, and the gases in the cylinders 131 are discharged to be almost replaced with the fresh air in the meantime. This leads to the fact that the fresh air nearly at the atmospheric pressure exists in all of the cylinders 131 after the engine 10 is stopped. Accordingly, it is possible to improve the restart performance of the engine 10 compared with that of the case in which a large amount of highly non-combustible residual gas is filled in the cylinders 131. Since the throttle valve 171 is open, the pumping loss seldom occurs and each of the moving parts of the engine 10 can be stopped at the position where the engine 10 is easily restarted, thereby making it possible to improve the restart performance of the engine 10.

Next, the operation when the accelerator pedal 53 is released while the vehicle is travelling at the speed not exceeding the threshold value with the engine 10 will be explained hereinafter along with the time chart shown in FIG. 7.

When the hybrid vehicle is travelling at the speed not exceeding the threshold value with the engine 10, the driver releases the accelerator pedal 53 at $T_0$. Thus, since the engine driving command becomes off, the ECU 41 closes the throttle valve 171. This allows the engine rotation speed to be gradually lowered, and the engine torque is drastically decreased to zero.

The engine 10 is left as it is for a while after the engine torque becomes zero so as to prevent the blowing up of the engine 10. After the state of the engine 10 is stabilized, the ECU 41 turns on the fuel cut flag at $T_2$ and executes the fuel cut. $T_2$ is set to the conventional normal start time. Here, the ECU 41 does not open the throttle valve 171. The engine 10 is stopped by the fuel cut. This allows the engine rotation speed to be drastically lowered, and the engine torque is also drastically decreased to zero.

When the engine is stopped while the hybrid vehicle is stopped for parking and the like, the oil pump 34 is stopped. For this reason, the operation oil is not supplied to the clutch 22 from the pump 34, and thus the clutch 22 is in released state. At this time, the shift position of the transmission mechanism 35 is adapted to be neutral. In addition, the hydraulic pressure adjustment valve 39 is adapted to be open.

In order to restart the engine 10 when the engine 10 is stopped while the hybrid vehicle is stopped for parking and the like, the electric power is supplied to the motor generator 24. By the electric power supply to the motor generator 24, the rotor 241 of the motor generator 24 is rotated. The driving force of the rotor 241 is transmitted to the oil pump 34 from the clutch output shaft 270 through the torque converter 32.

Since the clutch 22 and the one-way clutch 23 are released, the motive power of the motor generator 24 is not transmitted to the engine 10 even if the rotor 241 is rotated. The transmission mechanism input shaft 33 of the transmission mechanism 35 is rotated by the rotation of the torque converter 32, but the output shaft of the transmission mechanism 35 is not rotated since the shift position of the transmission mechanism 35 is in neutral.

The operation oil discharged from the oil pump 34 is supplied to the clutch 22, and thus the clutch 22 is engaged. Therefore, the driving force of the rotor 241 is transmitted to the crankshaft 11 from the clutch 22 through the input portion 21. This allows the engine 10 to be pushed to start.

When the vehicle starts after the engine 10 is started, the driving force of the engine 10 is transmitted to the automatic transmission 30 through the crankshaft 11, the input portion 21, the clutch 22, the rotor 241, and the clutch output shaft 270 in this order. Since the motive power is transmitted to the automatic transmission 30, the oil pump 34 is driven so that the operation oil is continued to be supplied to the clutch 22 and the engagement of the clutch 22 is maintained. When the shift position of the transmission mechanism 35 is set to forward driving or reverse driving, the motive power of the crankshaft 11 is transmitted from the automatic transmission 30 to the wheels, and thus the hybrid vehicle starts.

If the power shortage of the battery 47 occurs when the engine 10 is in the driving state while the vehicle is stopped, the battery 47 is assumed to be charged with the driving force of the engine 10. The shift position of the automatic transmission 30 is in neutral. The driving force of the engine 10 is transmitted to the rotor 241 through the one-way clutch 23. For this reason, the rotor 241 is rotated and the motor generator 24 operates as an electric generator. Therefore, the battery 47 is charged.

In the case that the vehicle is travelling and the battery is charged by driving the motor generator 24 with the driving force of the wheels during deceleration, that is, in the case of the regeneration operation with the motor generator 24 alone without the engine 10, the driving force of the wheels is transmitted to the oil pump 34 through the transmission mechanism 35. The hydraulic pressure adjustment valve 39 is closed. Therefore, the operation oil generated in the oil pump 34 is not supplied to the clutch 22, and thus the clutch 22 stays released. Since the rotor 241 connected with the transmission mechanism input shaft 33 is rotated, the motor generator 24 operates as an electric generator so as to charge the battery 47.

From the foregoing description, it will be understood that the vehicle control apparatus according to the present embodiment enlarges the opening degree of the throttle valve 171 as the vehicle speed becomes higher, when the engine 10 is automatically stopped while the vehicle is travelling. For this reason, the crankshaft 11 of the engine 10 immediately before stopping rotates several times by the inertia, and the gases in the cylinders 131 are discharged to be almost replaced with the fresh air in the meantime. This leads to the fact that the fresh air nearly at the atmospheric pressure exists in all of the cylinders 131 after the engine 10 is stopped. Accordingly, it is possible to improve the restart performance of the engine 10 compared with that of the case in which a large amount of highly non-combustible residual gas is filled in the cylinders 131.

The pumping loss seldom occurs because the throttle valve 171 is open, and the engine 10 is gradually stopped. For this reason, each of the moving parts such as the piston, the crankshaft 11, and the like can reach its predetermined stop position without fail because the rotation number of the crankshaft 11 by the inertia of the engine 10 increases compared with that of the case in which the throttle valve is fully closed. It becomes easy to control the valve stopping actuator so that each of the moving parts such as the piston, the crankshaft 11, and the like of the engine 10 stop at the predetermined positions respectively because the decrease of the rotation acceleration of each of the moving parts by the inertia of the engine 10 is slower than that of the case in which the throttle valve is fully closed. This allows each of the moving parts such as the piston, the crankshaft 11, and the like of the engine 10 to be stopped with high accuracy at the position easy to restart the engine 10, thereby making it possible to improve the restart performance of the engine 10.

Since the throttle opening degree is set to become large when the vehicle is travelling at high speed that makes the driver's sensitivity to the vibration low, the driver's sensitivity for the aftershocks of the vehicle generated by enlarging the throttle opening degree is decreased. For this reason, the drivability can be suppressed from being deteriorated. Therefore, it is possible to concurrently achieve the suppression of the drivability deterioration and the excellent restart performance of the engine by enlarging the throttle opening degree in response to the higher vehicle speed.

The vehicle control apparatus according to the present embodiment can make the timing of the fuel cut early and can improve the fuel consumption, because the vehicle control apparatus is operative to make the timing of the fuel supply stop earlier as the vehicle speed becomes higher. In addition, since the vehicle control apparatus can stop the engine 10 at the area of the driver's sensitivity being low, the drivability can be suppressed from being deteriorated.

The vehicle control apparatus according to the present embodiment makes the fuel cut timing earlier in response to the higher gear ratio set in the automatic transmission 30. Therefore, the vehicle control apparatus can suppress the drivability from being deteriorated even in the event of the aftershocks of the vehicle by the earlier timing of the fuel cut, because the driver's sensitivity for the aftershocks of the vehicle is low when the gear ratio is high.

The vehicle control apparatus according to the present embodiment enlarges the opening degree of the throttle valve 171 as the gear ratio set in the automatic transmission 30 is higher. Therefore, the vehicle control apparatus can suppress the drivability from being deteriorated even in the case of the large throttle opening degree, because the driver's sensitivity for the aftershocks of the vehicle is low when the gear ratio is high.

In the above mentioned vehicle control apparatus according to the present embodiment, the applied vehicle is assumed to be one motor type hybrid vehicle. However, the vehicle control apparatus according to the present invention is not limited to this, and can be applied to, for example, a hybrid vehicle of two motors type or an eco-run vehicle.

In the driving apparatus 1 according to the present embodiment, the ECU 41 is operative to set the timing to execute the fuel cut earlier than the normal condition if the vehicle speed exceeds the threshold value when the engine 10 is stopped. However, in the vehicle control apparatus according to the present invention, not limited to this, the vehicle control apparatus can, for example, execute the fuel cut at the same timing with the normal condition even if the vehicle speed exceeds the threshold value when the engine 10 is stopped.

In the driving apparatus 1 according to the present embodiment, the clutch 22 and the one-way clutch 23 are arranged in parallel relationship with each other in the inner peripheral portion of the rotor 241. However, in the driving apparatus according to the present invention, not limited to this, the clutch 22 and the one-way clutch 23 can, for example, be arranged in overlapped relationship in the axial direction in the inner peripheral portion of the rotor 241.

The driving apparatus according to the present invention makes an effect to concurrently achieve the improved drivability and the excellent restart performance of the engine, and is useful for a control apparatus for a hybrid vehicle.

{Reference Signs List}
1: driving apparatus
10: engine
11: crankshaft
15: cylinder
17: throttle valve portion
20: driving unit
22: clutch
23: one-way clutch
24: motor generator
30: automatic transmission
34: oil pump
40: control unit
50: vehicle speed sensor
54: accelerator sensor
100: fuel supply apparatus
171: throttle valve
172: throttle motor

The invention claimed is:

1. A vehicle control apparatus provided with an eco-run system which automatically stops an internal combustion engine under the condition that an automatic stop condition is established and restarts the internal combustion engine under the condition that a restart condition is established, and comprising:
   a throttle opening and closing unit that opens and closes a throttle valve for regulating an amount of air to be sucked into the internal combustion engine, and
   a vehicle speed detection unit that detects a vehicle speed, and
   the vehicle control apparatus being operative to increase an opening degree of the throttle valve in response to an increase in the vehicle speed detected by the vehicle speed detection unit when the internal combustion engine is automatically stopped while the vehicle is travelling.

2. A vehicle control apparatus as set forth in claim 1, which further comprises a fuel supply apparatus to supply fuel to the internal combustion engine, and which is operative to control the fuel supply apparatus to stop supplying the fuel to the internal combustion engine and to hasten a timing to stop supplying the fuel to the internal combustion engine in response to the increased vehicle speed when the internal combustion engine is automatically stopped while the vehicle is travelling.

3. A vehicle control apparatus as set forth in claim 2, which further comprises a transmission drivably connected with the internal combustion engine, and which is operative to hasten the timing to stop supplying the fuel to the internal combustion engine in response to an increased gear ratio set in the transmission.

4. A vehicle control apparatus as set forth in claim 1, which further comprises a transmission drivably connected with the internal combustion engine, and which is operative to increase the opening degree of the throttle valve in response to an increased gear ratio set in the transmission.

5. A vehicle control apparatus as set forth in claim 1 wherein as the vehicle speed increases, the opening of the throttle valve correspondingly increases.

* * * * *